W. M. WHEILDON.
APPARATUS FOR DISPENSING LIQUIDS.
APPLICATION FILED JUNE 17, 1914.
1,177,750.
Patented Apr. 4, 1916.
3 SHEETS—SHEET 3.
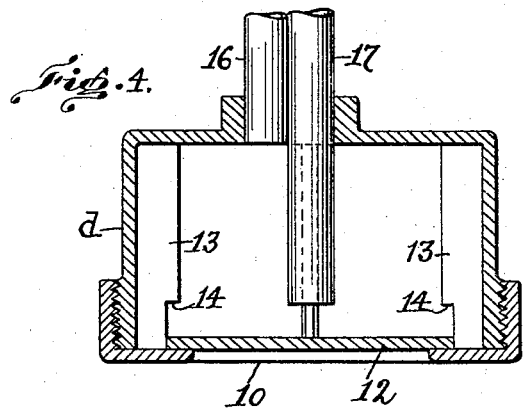
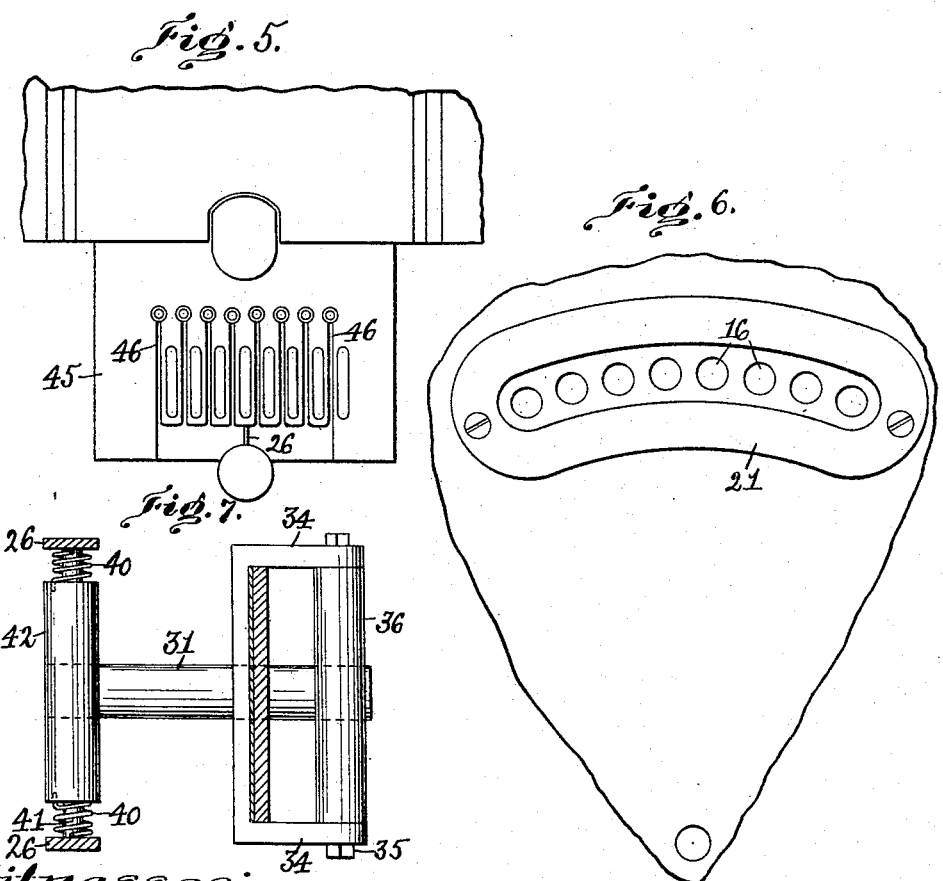

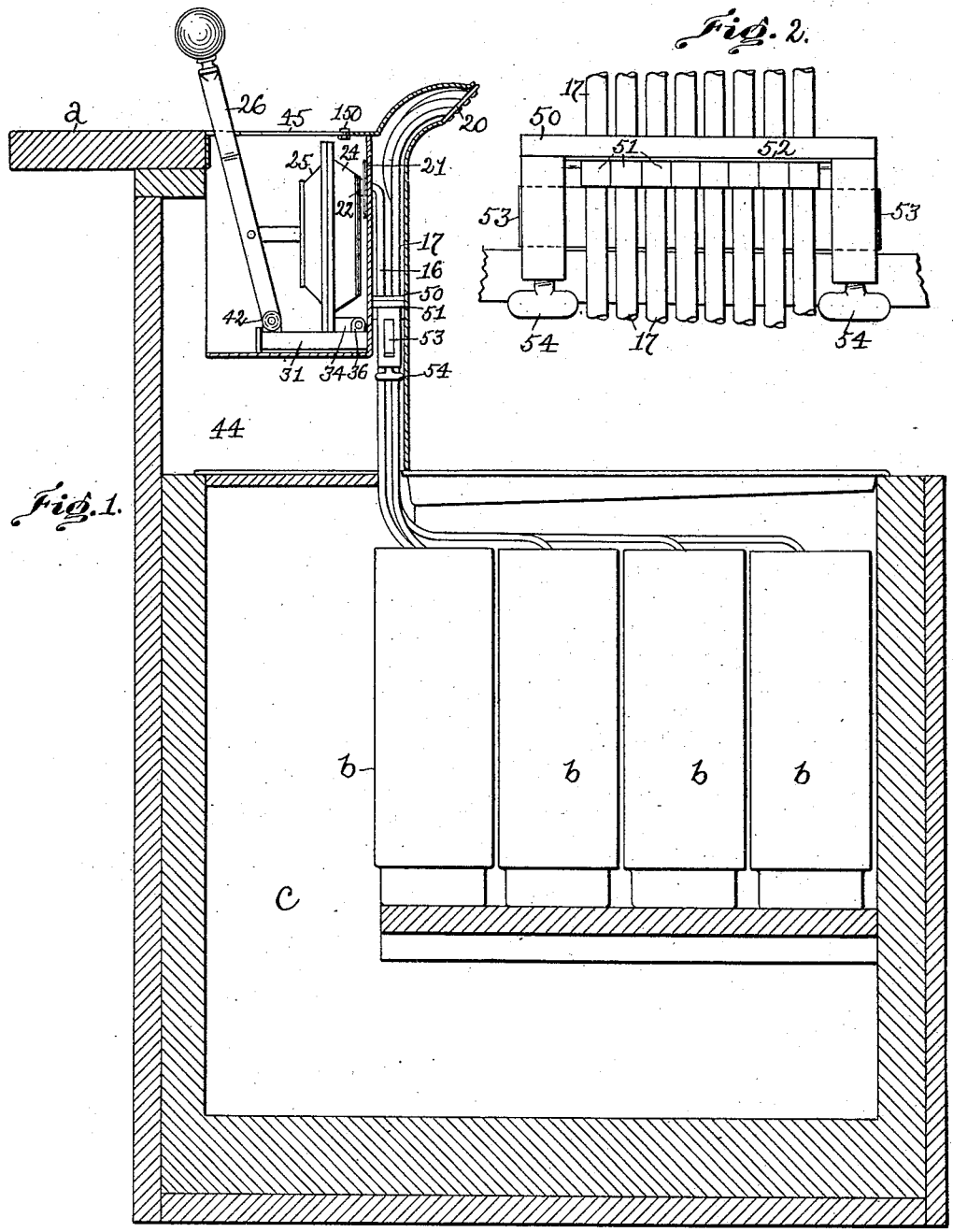

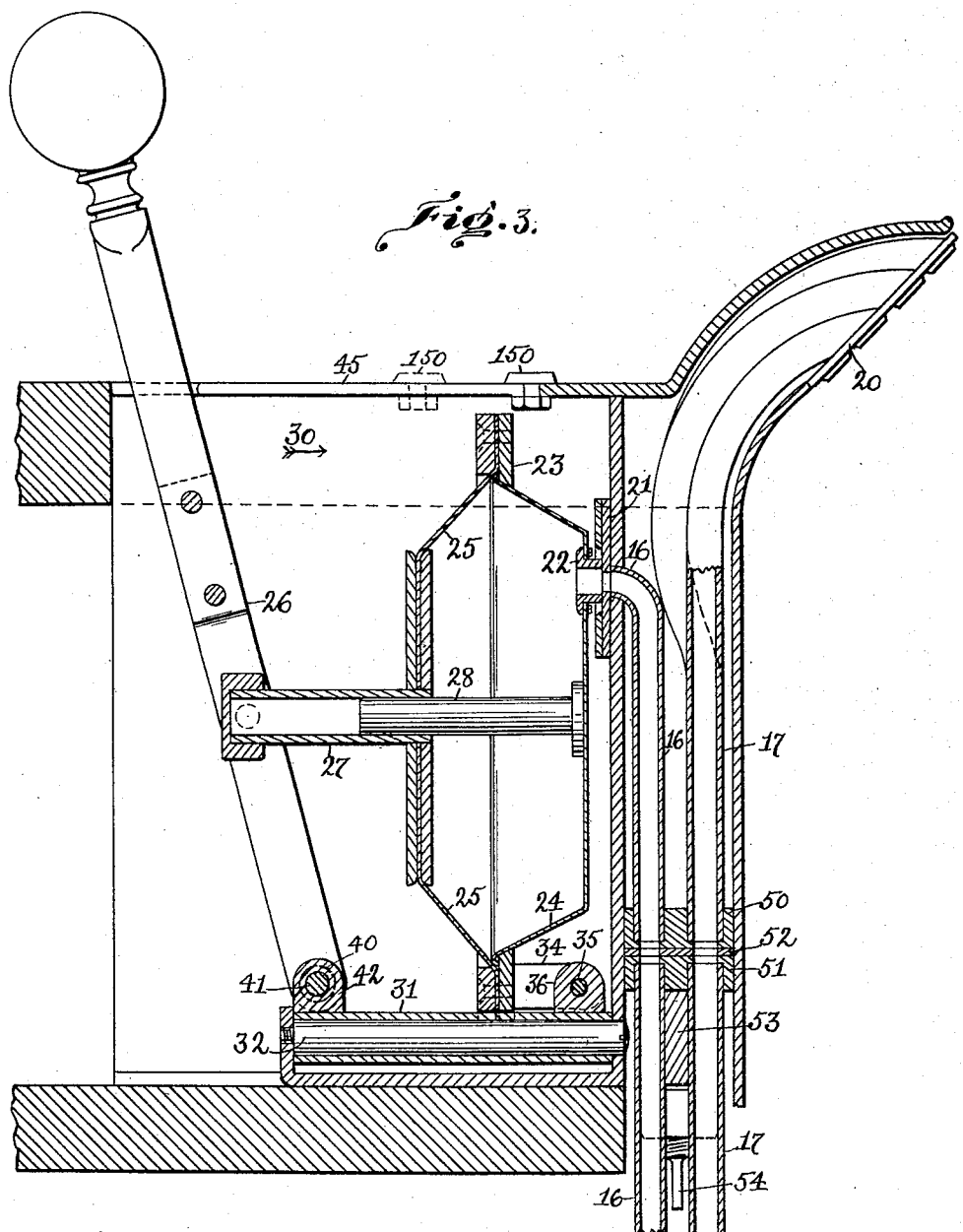

UNITED STATES PATENT OFFICE.

WILLIAM M. WHEILDON, OF ASHLAND, MASSACHUSETTS, ASSIGNOR TO AMERICAN SODA FOUNTAIN COMPANY, OF BOSTON, MASSACHUSETTS, A CORPORATION OF MASSACHUSETTS.

APPARATUS FOR DISPENSING LIQUIDS.

1,177,750.  Specification of Letters Patent.  Patented Apr. 4, 1916.

Application filed June 17, 1914. Serial No. 845,592.

*To all whom it may concern:*

Be it known that I, WILLIAM M. WHEILDON, a citizen of the United States, residing in Ashland, in the county of Middlesex and State of Massachusetts, have invented an Improvement in Apparatus for Dispensing Liquids, of which the following description, in connection with the accompanying drawings, is a specification, like characters on the drawings representing like parts.

This invention relates to an apparatus for dispensing liquids and is herein shown as embodied in a soda fountain or apparatus to which it is particularly applicable.

The invention has for its object to provide an apparatus with means as will be described, for discharging into a glass or other receptacle by gaseous pressure, a measured or predetermined quantity of syrup or other liquid.

The invention further has for its object to provide an apparatus, with which any one of a plurality of syrups or other liquids may be selected by the operator, and discharged into the glass or other receptacle by a single operating device.

The invention also has for its object to provide simple, compact, efficient and inexpensive apparatus, as will be described.

These and other features of this invention will be pointed out in the claims at the end of this specification.

Figure 1 is a vertical section, with parts in elevation, of a soda fountain embodying the invention. Fig. 2, a detail in elevation to be referred to. Fig. 3, an enlarged vertical section of the upper portion of the apparatus shown in Fig. 1. Fig. 4, a section of one of the measuring receptacles or cups. Fig. 5, a detail in plan of a portion of the apparatus shown in Fig. 1. Fig. 6, a detail in elevation showing the terminals of the pipes leading to the measuring cups, and Fig. 7, a detail to be referred to.

Referring to the drawings *a* represents a soda fountain, which is provided with a plurality of jars or vessels *b*, located in a chamber *c* and designed to contain different liquids, as for instance different syrups. Each container *b*, in accordance with this invention, has located in it means for measuring a given quantity of the liquid in the container, and in the present instance, said means consists of a vessel *d*, see Fig. 4, which is provided in its bottom with a port or opening 10, adapted to be closed by a valve 12, herein shown as a disk valve, which is guided in its movement within the vessel *d* by ribs 13, which may be arranged on the quarter, and each of which is provided with a shoulder 14 to limit the upward movement of the valve. The vessel *d* is designed to hold a predetermined quantity of liquid and is suitably supported within the container *b*, so that the liquid in the container can flow freely into the vessel *d* in the absence of air pressure within the vessel *d*.

For sake of distinction, the vessel *d* may be designated a measuring cup. The liquid contents of the measuring cup are designed to be discharged from the cup by air or other elastic fluid under pressure, and for this purpose the cup *d* is provided with an air inlet pipe 16 and with a liquid outlet pipe 17.

The air inlet pipe 16 terminates near the top of the cup, and the liquid outlet pipe terminates near the bottom thereof. The air inlet pipe is connected with means for forcing air or other elastic fluid into the cup, so as to displace the liquid therein and cause the latter to be discharged at a given point. When the air pressure is removed from the cup, the liquid in the container opens the valve 12 and flows into the cup. In this manner a predetermined quantity of the liquid in the container *b* can be delivered therefrom.

In the present instance, the liquid outlet pipe 17 is shown as extended to a head 20, which is located within easy reach of the operator and above the container *b*, and the air inlet pipe 16 is extended to a plate 21 preferably of rubber, with which coöperates the outlet nozzle 22 of an air pump 23, which is herein shown as of the diaphragm type, and comprises a casing provided with a fixed wall 24 and with a movable diaphragm or piston 25, which forms a movable wall of the pump casing. The diaphragm 25 is movable toward the fixed wall 24 of the casing, by a handle 26 having pivoted to it a cylindrical stem 27 attached to the diaphragm, and movable on a guide rod 28 attached to the fixed wall of the casing.

By moving the handle 26 in the direction of the arrow 30 in Figs. 1 and 3, the diaphragm piston 25 is moved toward the fixed wall 24 and the air in the casing is forced out through the nozzle 22, and through the air inlet pipe 16 into the cup $d$, wherein it forces the contents of the cup up through the outlet pipe 17 and into a glass or other receptacle, not shown, which is held by the operator in proximity to the head 20, but need not and preferably will not be in contact with said head. On the return or backward movement of the diaphragm piston, the air tight joint between the nozzle 22 and the plate 21 is broken, and the cup $d$ is again filled with liquid from the container $b$, which flows through the port or opening 10, the valve 12 being automatically opened by the liquid, and if desired, the liquid may be assisted by a spring, not shown, in opening the valve. The liquid in the outlet pipe 17 runs back into the cup $d$.

The invention as thus far described may be embodied in an apparatus having a single liquid container $b$ and a measuring cup $d$ within the same, but it is especially applicable for use in an apparatus in which a plurality of liquid containers are used, to hold different liquids, such for instance as different syrups.

In the present instance, the invention is embodied in a soda fountain or apparatus, and provision is made, whereby a single air pump may be employed for forcing a measured quantity of liquid from any one of a series of liquid containers. For this purpose, the air pump 23 is bodily movable with relation to the air inlet pipes 16 leading from the terminal plate 21 to the measuring cups $d$ within the several containers $b$. To this end, the pump casing is connected with a sleeve 31, mounted to turn on a stationary pin 32 suitably supported within the chamber $c$ in which the pump is located, (see Figs. 3 and 7).

In the present instance, the pump casing 23 has secured to it arms 34, which are pivotally mounted on a pin 35 extended through a sleeve 36 soldered or otherwise fastened to the sleeve 31 at right angles to the latter, so as to allow for a sufficient movement of the pump casing toward and away from the terminal plate 21, to bring the nozzle 22 into contact with said plate and thereby make an air tight joint therewith and establish connection of said nozzle with a selected inlet pipe 16, and to break the said connection, when it is desired to connect the pump with the inlet pipe of another container. Provision is made for returning the handle 26 to its starting position when released by the operator, and for this purpose, a spring 40, which is coiled about the pivot 41 for the handle, is employed in a manner well understood. The handle 26 is fast to the pivot pin 41, which is supported by a sleeve 42 attached to the sleeve 31.

Provision is made for insuring the proper connection of the pump with the air inlet pipe of the selected container, and for this purpose, the chamber 44 in which the pump is located, is provided a plate 45 having a plurality of slots 46, see Figs. 1, 3 and 5, one for each container, and into each of which slots, the handle 26 is adapted to be moved, when the pump is to be operatively connected with the selected container to force air thereinto. In Fig. 5, the selective plate 45 is shown as provided with eight slots, and the terminal tube plate 21 with eight air inlet tubes. The plate 21 is separated from the rear wall of the chamber 44, a sufficient distance to afford free movement of the handle laterally of the chamber. In some instances, it may not be desired to discharge the full capacity of the measuring cup, but only a desired proportion thereof, as for instance one half, one quarter, etc. To accomplish this result, I have provided a stop for the forward movement of the handle, in the form of a button 150, which may and preferably will be adjustable in each slot 46, and when secured in its adjusted position, arrests the handle in its forward movement and thereby limits the amount of air which is forced into the measuring cup, and thereby limits the quantity of liquid discharged into the glass or other receptacle.

Provision is made for conveniently assembling the inlet and outlet pipes 16, 17, and for this purpose the inlet pipe 16 for each container is made in two sections and the outlet pipe 17 in two sections, which are joined together liquid tight by a coupling, comprising as herein shown a member 50, see Fig. 2, having holes through it, into which the upper sections of the pipes 16, 17 are inserted, and a second member 51 having similar openings for the reception of the lower sections of said pipes, as represented in Fig. 3. The holes in one coupling member 50 communicate with the holes in the other member 51, through holes in a layer 52 of rubber or other packing material, and the pipe sections may be soldered or otherwise firmly secured liquid tight in the said sockets.

The upper sections of the outlet pipes 17 are led up to the head 20 as herein shown, and the latter is inclined and located above the upper end of the inlet pipes, which avoids dripping of the liquid when the pressure is removed, as the liquid in the out- C. S. WILLIAMSON.
MEANS FOR HANDLING COAL.
APPLICATION FILED AUG. 9, 1911.
1,177,751.
Patented Apr. 4, 1916.
5 SHEETS—SHEET 1.
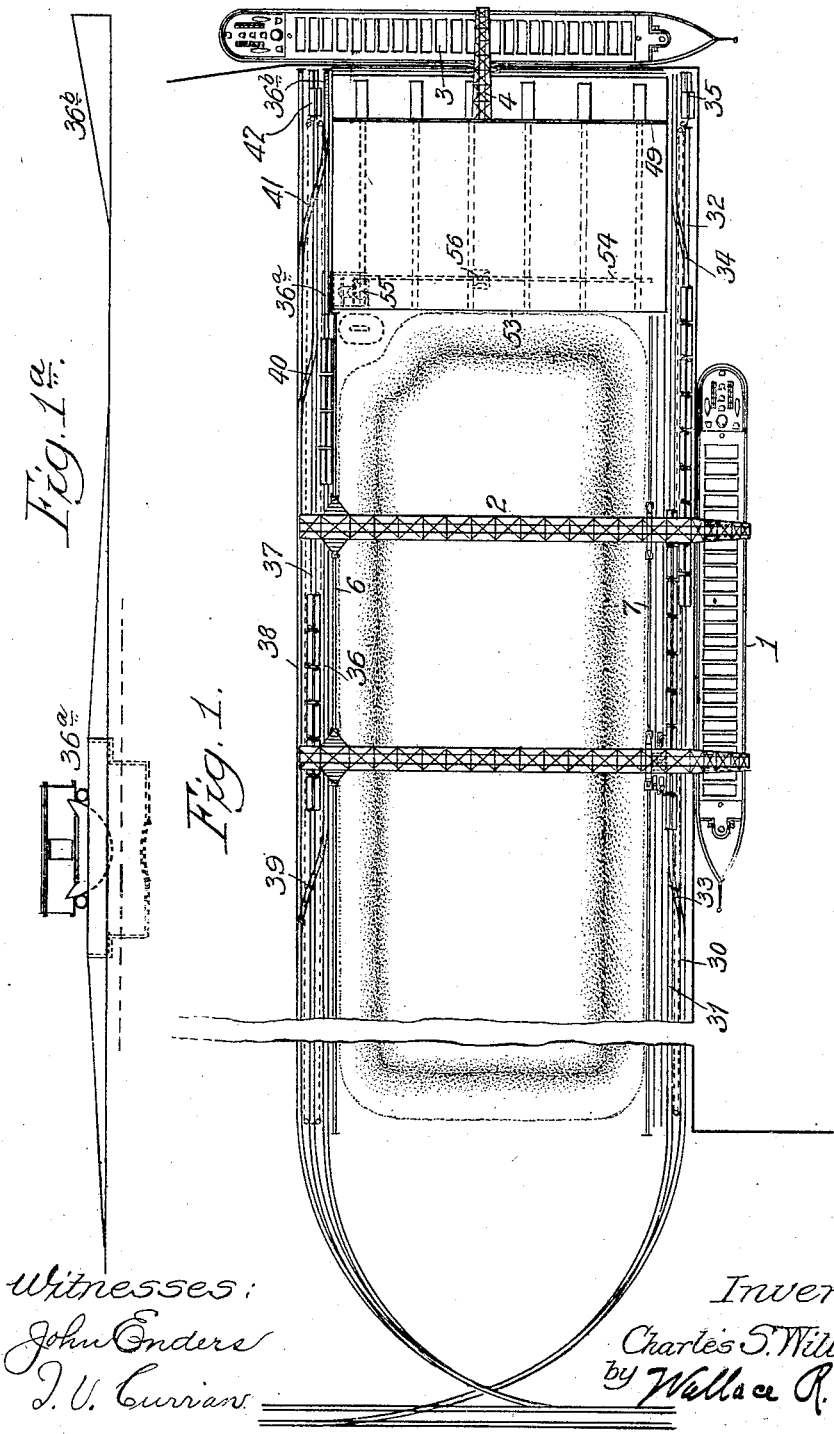

In the present instance the coupling member 50 is made as a single piece, to which all the upper sections of the pipes 16, 17 are secured, and the lower coupling member 51 is made individual for the lower sections of each pair of pipes 16, 17, and the lower coupling members are supported by a cross piece or bar 53, which is forced by set screws 54 against the upper member 50, said set screws being carried by depending arms 56 attached to the upper member 50.